July 21, 1931.   R. WIDERÖE ET AL   1,815,752

PROTECTIVE APPARATUS

Filed March 22, 1930

Inventors:
Rolf Wideröe,
Otto Mayr,
by Charles V. Tullar
Their Attorney.

Patented July 21, 1931

1,815,752

UNITED STATES PATENT OFFICE

ROLF WIDERÖE AND OTTO MAYR, OF KARLSHORST, GERMANY, ASSIGNORS TO GENERAL ELECTRIC COMPANY, A CORPORATION OF NEW YORK

PROTECTIVE APPARATUS

Application filed March 22, 1930, Serial No. 438,198, and in Germany March 28, 1929.

Our invention relates to improvements in protective apparatus for electric circuits and more particularly to relays and especially relays of the so-called distance type whose time of action is a function of the distance between the fault and the relay and an object of our invention is to provide improved and simplified protective apparatus whereby to obtain maximum flexibility in the control of the time-distance characteristic of the apparatus. Our invention is an improvement on protective apparatus of the type disclosed in the copending application of Otto Mayr, for Protective apparatus, Serial No. 339,048, filed February 11, 1921, and assigned to the same assignee as this invention.

Our invention will be better understood from the following description when considered in connection with the accompanying drawing and its scope will be pointed out in the appended claims.

Figure 1:
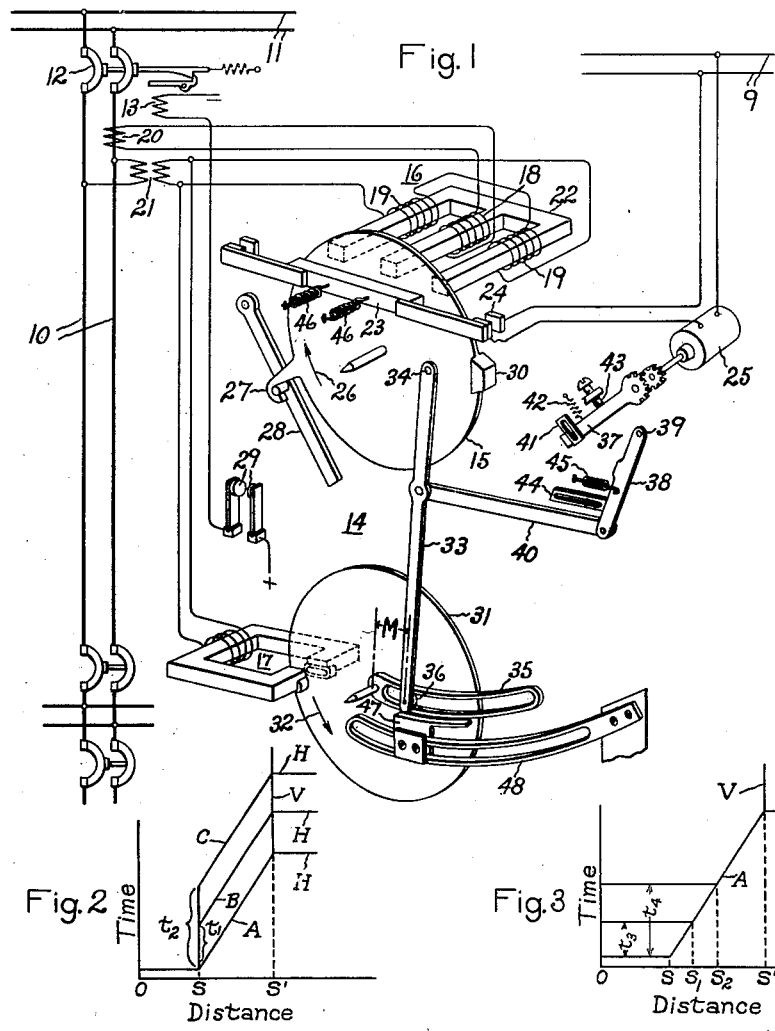

In the accompanying drawings, Fig. 1 illustrates an embodiment of our invention partly in diagram and partly in perspective and Figs. 2 to 5 inclusive illustrate time-distance characteristics of apparatus embodying our invention.

In Fig. 1, a circuit 10, shown single phase for simplicity, is arranged to be connected to a bus 11 by suitable circuit interrupting means such as a latched closed circuit breaker 12. This is provided with a trip coil 13 and is arranged to be controlled by a fault responsive protective means, such as a relay 14 which embodies our invention and which may be arranged to function on the occurrence of abnormal circuit conditions to control the circuit breaker 12 in accordance with time-distance characteristics such as are illustrated in Figs. 2 to 5 inclusive.

As shown, the relay 14 includes a movable member, such as a rotatably mounted disk 15 on which are exerted opposing effects by suitable cooperating means, shown as including motor elements 16 and 17, for preventing movement of the disk until a predetermined relation exists between said effects. The relay also includes means for varying the effect of one of the motor elements until the predetermined relation exists between the effects exerted by both of the elements. The motor element 16 constitutes an actuating means for the disk 15 in conjunction with which it may form a power directional relay having current and potential windings 18 and 19, respectively connected to be energized in accordance with a current and a voltage of the circuit 10 by suitable means such as current and potential transformers 20 and 21. The motor element 16 as shown, includes two magnetic members 22 and 23, the latter of which may be movable in response to a predetermined current in the winding 18 to control contacts 24 in the circuit of an operating device, such as a motor 25 of the means for varying the effect of the opposing means 17.

With power flow in the circuit 10 in a given direction, the motor element 16 tends to turn the disk 15 in the direction indicated by the arrow 26. Sufficient movement of the disk 15 in this direction will disengage the catch 27 from the contact controlling member 28 so that it may engage and close contacts 29 in the circuit of the trip coil 13. For insuring movement of the disk 15 in the direction indicated by the arrow 26 in case of faults so severe that the voltage becomes practically zero, the disk may be biased by suitable means such as the weight 30. Movement of the disk 15 in the direction opposite to that indicated by the arrow 26 is prevented by the engagement of the catch 27 with the member 28.

The opposing means is also shown as of the induction disk type, the motor element 17 being of the shaded pole electromagnetic type and being arranged to drive its associated disk 31 in the direction indicated by the arrow 32. As shown the motor element 17 is connected to be energized in accordance with a voltage of the circuit 10 through suitable means such as the transformer 21. The motor element 17, as is known to the art, exerts on the disk 31 a torque which is substantially proportional to the square of the circuit voltage.

For preventing movement of the disk 15 in the direction indicated by the arrow 26 under ordinary conditions, the opposing effect of the motor element 17 is applied to the actuating effect of the motor element 16 by means whose effect is variable to obtain the desired time selective action. As shown, this means comprises a member such as the rod 33, pivotally secured to the disk 15 at 34 and having its free end arranged for movement in an arcuate path which is movable with the disk 31 and whose center of curvature is the pivotal point 34. This arcuate path may be in the form of a curved slot in an arm 35 secured to the shaft of the disk 31, a roller 36 on the rod 33 engaging the slot.

In order that for a given torque on the disk 31, the opposing effect thereof on the disk 15 may be varied in accordance with the desired time action, there is provided driving means for moving the rod 33 so as to vary the position of the roller 36 relatively to the axis of rotation of the disk 31. For this purpose any suitable means may be used but for illustration we have shown a motor 25 which may be of the constant speed type.

For delaying the variation in the effect of one of the copoerating means in order to provide a wide range in the time distance characteristics, the motor is, in accordance with our invention arranged to actuate the rod 33 through suitable coupling means such as a variable free motion connection including a gear lever 37. After a predetermined movement, counterclockwise as shown in the drawing, this lever engages a rocking lever 38 pivoted at 39 and connected to the rod 33 by a link 40. For varying the angular movement of the gear lever 37 and thereby the time of initiating the movement of the rocking lever 38 and the parts attached thereto, we provide suitable means such as an adjustably positioned abutment 41. This may be mounted on the lever 37 as shown. For automatically returning the gear lever 37 to its initial position when the motor 25 is deenergized, a spring 42 may be provided to bring the lever to rest against a stop 43 which may also be adjustably positioned as is the abutment 41 and for the same reason.

In order to control the initial position of the rod 33 and thereby the initial opposing effect of the element 17, we provide in accordance with our invention an adjustably positioned stop 44 for the rocking lever 38 which together with the parts connected thereto is returned to the initial position by suitable biasing means such as a spring 45. The motor 25, if of the constant speed type, will, after the gear lever 37 engages the rocking lever 38, move the rod 33 uniformly and consequently the roller 36 so as to provide a desired time-distance characteristic as will hereinafter appear. The motor 25 is normally inactive but may be arranged to be energized in response to the abnormal condition for which the relay 14 is intended to operate. One way in which this can be done is to have the magnetic member 23 of the motor element 16 biased away from the coop-erating magnetic member 22 by suitable means such as springs 46 so that the member 23 will be attracted on the occurrence of a predetermined current in the winding 18 and thereby effect the closing of the contacts 24 in the circuit of the motor 25 to energize the same from a suitable control source 9.

In order further to control the time-distance characteristic of the relay 14, we provide, in accordance with our invention, means for preventing the operation of the relay over some desired range of movement of the rod 33 about its pivot 34 even though the effect of the element 16 may be sufficient to overcome the effect of the element 17. As shown, this means comprises a stop 47 adjustably positioned on an arm 48 and in the path of movement of the end of the rod 33. The length of this stop is proportioned in accordance with the range over which operation is to be prevented.

With the arrangement shown, the torque on the disk 15 is proportional to the product $EI f(\phi)$, E and I being the voltage and current of the circuit respectively and $f(\phi)$ a function of the phase angle between them, depending on whether the motor element 16 is constructed to operate in accordance with the actual power, the wattless component of the power or some other arrangement. There is consequently exerted through the medium of the disk 15 on the rod 33 a force F, which is proportional to the torque exerted on the disk and may be presented as follows:

$$F_1 = K_1 EI f(\phi)$$

$K_1$ being a proportionality constant. The torque exerted on the disk 31 is proportional to the square of the voltage, that is $E^2$ as is well known to the art, but this torque is transmitted to the disk 8 through the medium of the arm 35 and the rod 33 by a variable lever arm M which is equal to the distance between the axes of rotation of the disk 31 and the roller 36. The force transmitted to the disk 15 by the motor element 17 is therefore dependent on M and may be expressed as follows:

$$F_2 = \frac{K_2 E^2}{M},$$

$K_2$ being a proportionality constant.

The instantaneous position of the roller 36, that is to say the rod 33, therefore, determines the release of the contact controlling member 28, except for the lockout range controlled by the stop 47. The time of the release is of course determined by the initial positioning of the rod 33 and the gear lever 34 together with the length and position of the stop 47. For example, when the roller 36 is in its extreme left position the lever arm M is small and for a given voltage the element 16 would have to exert a large force $F_2$ to overcome the element 17. As soon however as the value of M is increased by the action of the motor 25, the force $F_2$ does not have to be so large for the same voltage. In short, movement of the disk 15 will occur as soon as the ratio between the forces $F_1$ and $F_2$ exceeds a predetermined value as will appear from the following. When there is equilibrium, that is the forces $F_1$ and $F_2$ are equal, there results the following equation:

$$\frac{K_2 E^2}{M} = K_1 E I f(\phi)$$

from which follows:

$$M = \frac{K_2 E}{K_1 I f(\phi)}$$

When this condition of equilibrium is passed, that is when the ratio between E and $I f(\phi)$ exceeds a predetermined value, the disk 15 tends to move in the direction indicated by the arrow 26 to effect the closing of the contacts 29 and will do so except for the range in which movement is prevented by the stop 47. Since M increases proportionately to the time of movement of the rod 33 and since the value of M required for releasing the disk 15 is dependent on the ratio between E and $I f(\phi)$, that is on the distance between the relay 14 and the fault point, the time of release is also dependent on this length. With power flow in a direction tending to move the disk 15 opposite that indicated by the arrow 26 no tripping action occurs.

Referring now to Figs. 2 to 5 inclusive, if the vertical and horizontal axes represent the time of relay action T and the distance D between the relay and a fault, that is the circuit resistance, reactance or impedance then the dependance between T and D for various settings will be shown by the different line characteristics.

Assuming first that the stop 47 is positioned so far to the right on the arm 48 as to be clear of the path of movement of the roller 36 and that the stop 44 is in some given position, then according to this position, that is the distance M between the axis of the disk 31 and the roller 36, the time of operation of the relay will be the minimum over a relay fault distance OS corresponding to M. If the stops 41, 43 or both are so positioned that the crank and rock levers 37 and 38 initially touch, then for faults beyond S, the time will vary substantially uniformly according to the inclined line A. If the stop 41 or 43 or both are so positioned that the crank and rock levers do not initially touch, then for faults beyond S the time will vary according to the inclined line B and although increasing uniformly will be greater for the corresponding distances by the time $t_1$ necessary for the crank lever to move into engagement with the rock lever. If the stops 41 or 43 or both are so arranged that the initial angle between the crank and rock levers is still greater, then the time will vary according to the inclined line C and the times will be greater by $t_2$. If the roller 36 is limited in its movement on the arm 35, that is the slot in this arm is closed at the right, then after the end of the movement corresponding to fault distances greater than OS', no contact operation can occur and the characteristics conclude according to the vertical line V. If the slot in arm 35 is open-ended, then the characteristics conclude according to the horizontal lines H.

Figure 3:
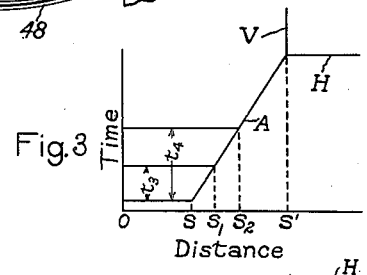

Assuming now that the stop 44 is in some given position, that the stop plate 47 is clear of the path of movement of the roller 36 and that the crank and rock levers 37 and 38 initially touch, then, as shown in Fig. 3, the relay has its minimum time for the fault distance OS and then uniform time according to the inclined line A for distances between S and S'. Now, if the stop 47 is positioned on the left of arm 48 in the path of movement of the roller 36, then some time $t_3$ must elapse before the roller 36 can move far enough to the right to be clear of the stop 47. This in effect also increases M and the substantially constant time $t_3$ plus the minimum time prevails over a distance $OS_1$. For distances between $S_1$ and S' the time varies uniformly according to the inclined line A. If the stop 47 is moved farther to the right so that it takes a longer time $t_4$ for the roller 36 to clear the stop, then the time is $t_4$ plus the minimum for the distance $OS_2$. For faults within the range of distance $S_2 S'$, the time varies uniformly according to the inclined line A. For faults beyond OS' the characteristic will be according to the lines H or V depending on whether the right hand end of the slot in the arm 35 is open or closed.

Figure 4:
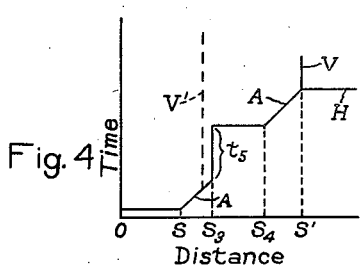

Assuming that the crank and rock levers 37 and 38 initially touch and that the stop 47 is so positioned as to be under substantially the right half of the arm 35, then, as shown in Fig. 4, the characteristic will be the minimum time over the distance OS, uniformly varying according to the inclined line A until the roller 36 comes over the stop 47 and from there on no tripping action, as indicated by the dotted vertical line V'. If the stop plate 47 is located intermediate the ends of the arm 35, then there will be a break in the uniform time characteristic A such that for distances within the range $S_3 S_4$, the time will be increased by $t_5$, the period during which the roller 36 is moving over the stop 47. From $S_4$ to S' the time is again uniformly varying according to A. For distances greater than OS' the characteristic is either according to the line V or the line H, depending on whether the slot in 35 is closed or open.

Figure 2:
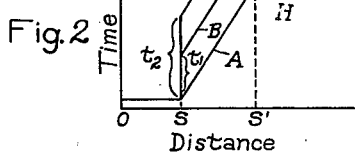
Figure 5:
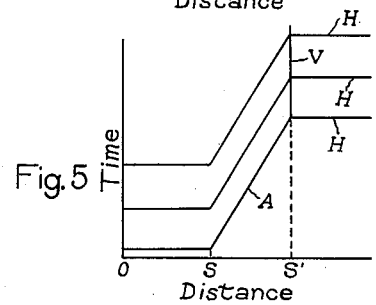

Fig. 5 represents characteristics which are a combination of those shown in Figs. 2 and 3, that is the result of varying the position of the stop 47 and the angular displacement between the crank and work levers 37 and 38. The lowest characteristic represents the condition where the crank and rock levers initially touch and the stop 47 is not in the path of movement of the roller 36. Now by increasing the initial angularity between the crank and rock levers either by moving the stop 41 or 43 or both and moving the stop 47 so that its right hand end projects under the roller 36, the characteristic is shifted parallel to itself to the intermediate and top positions shown with either a horizontal or vertical conclusion depending on the condition of the end of the slot 35.

While we have shown our invention in considerable detail we do not desire to be limited to the exact arrangements shown, but seek to cover in the appended claims all those modifications that fall within the true spirit and scope of our invention.

What we claim as new and desire to secure by Letters Patent of the United States, is:

1. A relay including a movable member, cooperating means for exerting opposing effects on said member to prevent the movement thereof until a predetermined relation exists between said effects, means for varying the effect of one of said cooperating means to produce the predetermined relation between said effects whereby to cause movement of the member and means for delaying the variation in the effect of said one of said means.

2. A relay including a movable member, cooperating means for exerting opposing effects on said member to prevent the movement thereof until a predetermined relation exists between said effects, means for varying the effect of one of said cooperating means to produce the predetermined relation between said effects whereby to tend to cause movement of the member, means for delaying the variation in said one of said effects and means for positively preventing the movement of the member over a given range in the variation of said one of said effects.

3. A relay including a movable member, cooperating means for exerting opposing effects on said member to prevent the movement thereof until a predetermined relation exists between said effects, means for varying the effect of one of said cooperating means to produce the predetermined relation between said effects and means for positively preventing the movement of said member over a predetermined range in the variation of said one of said effects.

4. A relay including a movable member, actuating means for exerting an effect tending to move the member in one direction, opposing means for exerting an effect tending to move the member in the opposite direction and means independent of said actuating and opposing means for varying the effect of one of them to cause movement of the member in said one direction when a predetermined relation exists between the effects exerted by said actuating and opposing means including driving means coupled to said members through a free-motion connection for delaying the variation of said one of said effects.

5. A relay including a movable member, actuating means for exerting an effect tending to move the member in one direction, opposing means for exerting an effect tending to move the member in the opposite direction, means independent of said actuating and opposing means for varying the effect of one of them to tend to cause movement of the member in said one direction when a predetermined relation exists between the effects exerted by said actuating and opposing means and adjustably positioned means for positively preventing movement of said member over a given range in the variation of said one of said effects.

6. In combination with an electric circuit, a relay including a movable member, actuating means tending to move the member in one direction in accordance with a function of a current and a voltage of the circuit, opposing means tending to move the member in the opposite direction in accordance with a function of said voltage normally predominant to prevent movement in said one direction, means independent of said actuating and opposing means for varying the effect of one of them to tend to cause the movement of the member in said one direction when a predetermined relation exists between the current and the voltage energizing said actuating and opposing means and means for delaying the variation in said one of said effects.

7. In combination with an electric circuit, a relay including a movable member, actuating means tending to move the member in one direction in accordance with a function of a current and a voltage of the circuit, opposing means tending to move the member in the opposite direction in accordance with a function of said voltage normally predominant to prevent movement in said one direction, means independent of said actuating and opposing means for varying the effect of one of them to tend to cause movement of the member in said one direction where a predetermined relation exists between the current and the voltage energizing said actuating and opposing means and means for positively preventing movement of said member over a given range in the variation of said one of said effects.

8. In combination with an electric circuit, a distance relay for controlling the circuit including a movable member, actuating means connected to be energized in accordance with the power of the circuit and tending to move the member in one direction when the power of the circuit is in a given direction, opposing means connected to be energized in accordance with a voltage of the circuit and tending to move the member in the opposite direction, means for preventing movement of the member in the opposite direction, means for varying the effect of the opposing means independently of the circuit voltage arranged to be energized on the occurrence of an abnormal circuit condition to tend to cause movement of the member in said one direction when the ratio between the voltage and the current of the circuit exceeds a predetermined value, means associated with said varying means for delaying the effect thereof and means for positively preventing movement of the member in said one direction over a given range in the variation of the effect of said opposing means.

In witness whereof we have hereunto set our hands this 4th day of March, 1930.

ROLF WIDERÖE.
OTTO MAYR.